Patented Aug. 7, 1945

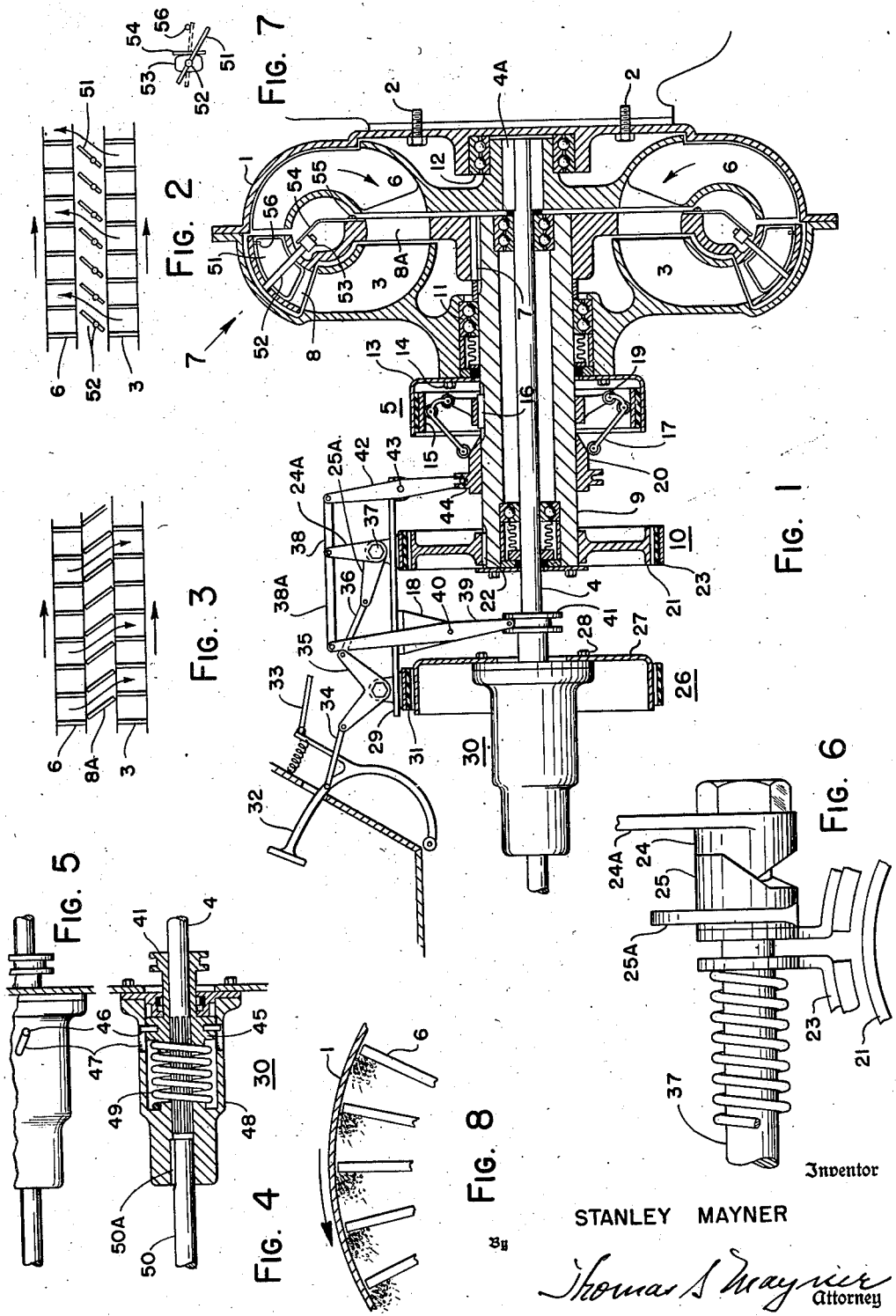

2,381,682

UNITED STATES PATENT OFFICE 2,381,682

POWER TRANSMITTING APPARATUS

Stanley Mayner, Cleveland, Ohio

Application May 13, 1941, Serial No. 393,237

9 Claims. (Cl. 60—54)

This invention relates to power transmitting apparatus and it is a primary object of this invention to provide a new and improved apparatus of this character and at increased efficiencies.

It is a further object of this invention to provide a reaction member in my apparatus that is capable of performing a plurality of functions in accordance with torque requirements.

It is another object to provide a type of construction of the inner and moving parts of my fluid power transmitting apparatus to enable the utilization of inherent characteristics of the working fluid.

Another object is the provision of a mechanical device adapted to change the character of my apparatus, i. e., a torque converter to a coupling and vice versa, in accordance with load or torque requirements.

It is another object of my invention to automatically vary the turning moment in the driven member according to load.

Additional objects of my invention will become apparent from the following description and with reference to the drawing, wherein:

Fig. 1 represents, in substantially complete cross section, my combination hydrodynamic torque converter and coupling.

Figs. 2 and 3 schematically represent a preferred blade arrangement of my apparatus.

Figs. 4 and 5 represent a sectional and projected view of my automatic torque changing device.

Fig. 6 diagrammatically represents a cam operated braking device.

Fig. 7 is a diagrammatic representation of a plan view of a portion of the reaction member.

Fig. 8 is a partially diagrammatic representation of fluid behavior in the casing of my apparatus.

Referring to Fig. 1, I show therein a complete schematic arrangement of a preferred embodiment of my invention where total control of speed and torque transmission is centered in a single foot pedal, or the control may be in a single hand operated lever on a steering column of an automobile or otherwise as desired, (not shown). As shown in the figure, the unit is operating under light load, and in this instance as a coupling. This condition would be had when a steady speed is maintained as on a substantially level road in the case of an automobile.

The casing of my fluid power transmission apparatus consists of an outer portion 1 secured to an engine flywheel (not shown) in any desirable manner as by bolts 2, and having as an integral part driving blades 3; the entire casing rotating freely on a power transmitting shaft 4. The casing further contains a driven member 6 keyed to the shaft 4 at 4A. Between the driving and driven members there is interposed a reaction member 8 which performs a multiplicity of functions as will be explained hereinafter. The reaction member 8 is keyed at 7 to a tubular shaft 9 and is capable of free rotation about shaft 4 when not held by clutching device 10. The casing 1, as hereinbefore stated, rotates freely about shaft 4 riding on bearings 11 on hollow shaft 9 and bearings 12 on the keyed portion of the driven member 6. Thus the driving and reaction members are entirely independent of each other, of the driven member 6, and of the shaft 4.

I provide a holding or clutching device 5 whereby reaction member 8 is tied in with the driver to form a coupling, the two members acting as a unit. The clutching or holding device 5 consists of a drum 13 fastened by bolts 14 to the casing 1, and an inner outwardly expanding brake 15. In the position shown the brake 15 is in contact with the drum 13. The brake 15 is in turn keyed to the hollow shaft 9 at 16, in this manner the driving member 3 and reaction member 8 form one single impelling unit, for the reaction member becomes fixed to the driving member and through such union creating a simple coupling consisting essentially of driving and driven members.

The expansion of brake 15 of device 5 is effected by means of a bellcrank 17 having one end pivoted at 19 and its other end slidable relative to a partially conical cylindrical cam 20 movable on hollow shaft 9. The brake 15 may thus, by movement of part 20 in one direction, be placed in a fully contacting position with drum 13 or by movement of part 20 to the other position brake 15 is placed in a released position with drum 13, and in turn converting my apparatus from a simple coupling to a torque converter. A release of drum 13 will free the reaction member 8 from being a driving member to one that can be entirely free to rotate. That is, the reaction member 8 is now independent of the driving member 3. If, however, driven member 6 is held from rotation by holding shaft 4, then the fluid from the driving member is directed against the reaction member causing it to rotate in an opposite direction. The reaction member thus absorbs the energy that would have been imparted to the driven member 6. However, this operation takes place only during idling periods of the prime mover, for during acceleration or deceleration it is desirable to have the unit work as a torque converter or a coupling. The shaft 4 holding means are hereinafter described.

By the term "idling" I mean a minimum continual rotation of the prime mover (not shown) and of the driving member 3 during substantially no load or predetermined load periods, or when the vehicle containing my apparatus is not in motion. Idling may start at some point before the complete withdrawal of the foot pedal.

The brake or holding device 10 is a conventional type of band brake comprising a braking wheel 21 keyed to hollow shaft 9 at 22 and a circumferential friction band 23. The brake is applied by constricting band 23 by means of movement of opposed raised face cams 24, 25, particularly shown in Fig. 6. Then by application of either braking devices 5 or 10 I may change the character of my apparatus to a coupling type or a torque converter at the proper moment, and automatically.

A third braking means 26 is employed for purposes of such neceessary operations as stopping all motion of the power transmitting shaft 4, idling, and stopping the vehicle using my apparatus. The brake is simply composed of an external braking band 31 acting on a drum 27 fastened by means of bolts 28 to the casing of my automatic controller 30, whose function will be later explained, and to which shaft 4 is splined. For constricting the braking band 31 any type of cam means may be employed as those of Fig. 6.

Brake 26, when applied, is designed to bring to a complete stop the rotation of shaft 4. However, in downgrade travel it is usually the practice to utilize the engine as a partial "drag" and not resort to the brake, this is effected by not completely withdrawing the foot pedal. The spring 49 in my load responsive device 30 can be made stiff to a desirable degree to approximate a predetermined load before yielding even if brake 26 is partially applied. Then during this period until this load is reached and the foot pedal is fully withdrawn, the engine will be idling, the reaction wheel will be independent of the driving member, and will continue to absorb the energy meant for the driving member. With the brake partially but not fully applied the rotation of driven member 6 will be decreased accordingly and to a point where the free reaction wheel will absorb substantially all of the energy meant for the driving member. Should the driving member rotate more rapidly than the driven member the free reaction member will similarly perform but taking the thrust from the other side. If the brake is fully applied the vehicle will stop, the engine will continue idling, and the reaction wheel remain free until the accelerator pedal is again depressed.

The three braking or holding devices 5, 10 and 26 are made to act normally sequentially giving a smooth operation and in accordance with load encountered or torque to be transmitted by the shaft 4. Single control may be placed in a foot pedal 32 located conveniently in a vehicle. To the foot pedal there is pivoted a rod 33, partly shown, which may be connected to a carburetor of a prime mover operating my power transmitting apparatus. The foot pedal is also pivotally joined by the connecting link 34 to a bell crank 35 which has on it a cam as hereinbefore explained adapted to constrict the braking band 31 about drum 27 and bring shaft 4 to a stop. A link 36 in turn joins bell crank 35 with cam arm 25A (Fig. 6), while opposing cam arm 24A, mounted on the common shaft 37, is pivoted at its other end with floating links 38, 38A. Link 38A is pivoted at its other end to member 39 which is pivoted at a desired point between its ends at 40, the pivot 40 being fixed in an extension 18 of bar 29 which can be desirably attached to the vehicle chassis. The other end of member 39 rides in a cylindrical collar 41 on shaft 4. Link 38 is pivoted at its other end to member 42 which is pivoted substantially intermediate its ends at 43, and the other end moving in a yoke 44 which is a part of the cylindrical cam 20.

The cam arms 24A and 25A, having cams 24, 25 respectively, are so originally positioned relative each other that even a full down travel of the foot pedal 32 will cause but an initial mating or contact of the cams; yet a release of brake 5, that is a retraction of cylindrical cam 20, will cause a movement of floating link 38, 38A forward and thus a definite movement of cam arm 24A in a similar direction immediately locking with cam 25 of arm 25A and locking or holding brake 10. The locking of the cams will at all times depend upon the relative angular position of cam arms 24A, 25A, and having once locked device 10 cam 24 is capable of further movement on the raised flat surface of cam 25, thus permitting great angular movement of the cam arms. This relative positioning of cams 24, 25 can readily be had by a determination of the various link and member lengths, and Fig. 6 is but a representative example of the type of the cams and their ability to constrict holding band 23 about drum 21.

The device 30, comprising my automatic means for converting my power transmitting apparatus from a straight-forward coupling to a torque-converter, and vice versa, is shown in Fig. 4 and consists of the hereinbefore mentioned cylindrical collar 41 slidably mounted on shaft 4, moving in or out of casing 48, its inside portion 45 being enlarged and fitting closely within the casing, and having pins 46 rigidly fixed within this portion. This inward enlarged portion 45 of yoke 41 is splined and moves on the splined portion of shaft 4. The pins 46 extend into related angular slots 47 in the casing 48. The casing 48 is keyed to driving shaft 50 as at 50A, the transmission of power from shaft 4 to 50 taking place solely through pins 46, two of which are shown but any number may be used. A compression spring 49 abuts the inside of the casing 48 and collar portion 45. The compressive resistance of the spring 49 is made equivalent to a certain initial desired increase in load or to a transition point whence my apparatus is converted from a coupling to a torque converter.

In operation, a greater than normal twist of the shaft 4 will cause the splined pin bearing member 45 to move the pins 46 in their relative angularly positioned channels 47. Cylindrical collar 41 being part of member 45 will move with it against the resistance of compression spring 49 and will thus in turn cause member 39 to pivot about 40, forcing floating links 38, 38A to move forward, thence moving member 42 which causes a release of device 5 by the withdrawal of cylindrical cam 20, freeing reaction member 8 from the driver 3, and by cam 24 on arm 24A locking with cam 25 on arm 25A the holding device 10 is at once put into operation holding fast reaction member 8, making it a guide member for the fluid transmitted from the driver 3 to the driven member 6. The load overcome, the spring 49 will then expand, forcing collar 41 to its former position and the members 39, 42, cam arms 24A, 25A will separate releasing device 10 and guide member 8, device 5 immediately going into a locking position acquiring additional driving area in taking over the reaction or guide member 8 as part of the driver, and the unit thus automatically becoming a coupling once more.

From an operating standpoint, considering an automobile, the foot pedal 32 need be the sole source of control. During starting or on heavy loads it will be depressed considerably, accelerating the motor or prime mover. The torque necessary to move the vehicle will at this moment need be great, the twist on the shaft by the rapidly moving driving member 3 will force collar 41 to move, locking brake drum 10 to effect a guide member of reaction member 8, and thus creating a torque converter wherein the flow of fluid is directed into the vanes of driven member 6. The vehicle started, or the load overcome, the torque converter becomes again a coupling.

I have thus far described a novel and an automatically operating unit that is controlled from a single point, the foot pedal 32, one that will adapt itself immediately to any change in load encountered. However, I have further increased the efficiency of my apparatus by a particular design and arrangement of the reaction member 8. I have found that if the angle of moment of the circulating fluid is controlled at all speeds at time of entering the driven member's vanes that greatest possible torque is always being delivered. And further after substantially expending its kinetic energy in the driven member 6, the fluid tends to build up a pressure which I utilize by my construction in securing free and unhampered passage back into the vanes of the driving member.

Referring to Figs. 2 and 7, I show therein a construction of the top portion of the reaction member 8. Movable blades 51 rotate with pins 52 which have fixed to one end a substantially flat surfaced cam 53 frictionally moving relative a bent spring 54 rigidly fastened to the reaction member's body by means of bolts 55. The angular movement of blades 51 is, however, limited by means of stop pins 56, fixing the maximum possible angular movement determining the angle of transmission of the fluid delivered to the driven member. The normal position of movable blades 51 may be as shown in Fig. 2. Substantially rectangular cam 53 fixed rigidly to pin 52 and to which the blade 51 is also fixed determines the angle of the blade and the maximum opening possible by the stop pin 56.

When the driver 3 accelerates the entering fluid exerts a greater pressure on the larger side of blade 51 causing it to revolve against the frictionally retarding bent spring 54, and straighten, permitting a greater volume of fluid to act on the driven member, in accordance with the increase in load. Then with a greater volume of fluid acting on the driven member greater torque is imparted to it and the increased load overcome. With decreasing load and increasing speed of the driver the reaction member automatically becomes part of the driver and the blades 51 attempt to resume their normal angular position, that of being partially closed. This closure then changes the angle of moment of the fluid, imparting to it an increased velocity which at high speeds will cause the driven member to rotate at a speed approaching that of the driver. These movable blades not only thus control the most efficiently desirable angular delivery of fluid to the driven member, but also provide for a wide range of speeds.

Referring again to Fig. 2, I show the relative position of the driving blades 3, reaction member blades 51, and the driven member blades 6, and it can be seen that the unit under light load and rotating in the direction of the arrows, the blades 51 will be positioned as shown, delivering fluid in less volume but increased velocity. But with increased load blades 51 will be opened proportionally and deliver fluid to blades 6 in increasing volume and decreasing velocity.

The lower blades of my reaction member are desirably so positioned in order to deliver fluid to the driver at an angle avoiding abrupt entrance into driver blades, consequent shock, and tendency to slow down driver speed during overload periods. This particular blade position is shown in Fig. 3. It can be readily understood from this illustration that the entry of fluid from blades 6, into blades 8A, thence into blades 3, is more uniform. This lower blade design of reaction member 8 in effect creates the last portion of the driven member 6 as a driving member, for it converts the built up pressure energy into kinetic energy facilitating re-delivery to the driver, thus increasing the efficiency of the driver as well as of the entire unit, and utilizing the maximum amount of energy possible.

I further increase the efficiency of the unit by utilizing the particular behavior of the circulating fluid. Due to centrifugal action there is created considerable disturbance of the circulating fluid taking place on the inner periphery of the casing 1. This disturbance takes the form of swirls, eddies, or currents adhering to the periphery and thus retarding the speed of the driver. This retardation has considerable effect, when the unit is acting as a coupling, on the driven member, creating a certain amount of slippage and consequent waste of energy. By using the casing having an integrally built in driver and rotating the casing I carry along these disturbances. Then by leaving the driven member's blades or vanes uncovered I cause the disturbances to act on the blade ends to aid in their rotation. This I show schematically in Fig. 8. The small eddies or currents are shown at the top of the uncovered blades 6 dragging or pulling on the blades in the direction of rotation of the driven casing.

While I have described my apparatus in accordance with the illustrations shown in my drawing, it is capable of further use inherent to it as, for instance, by holding the driven member 6 while permitting reaction member 8 to run idle, then all energy will be absorbed by the latter causing it to reverse rotation, and which rotation could be utilized readily for operation of transmission gears, housing drums, etc. There are other uses which will be apparent to those skilled in the art than the embodiments herein described; therefore I wish it to be understood that they are illustrative only, and that my invention is not limited thereto.

What I claim as new, and desire to secure by Letters Patent of the United States, is:

1. In a power transmitting apparatus of the character described, a fluid driving member, a fluid driven member, a torque transmitting shaft attached to the driven member, a reaction member for directing circulating fluid to the driven member thence back to the driving member, means adapted to connect said reaction member to or release it from said driving member, and means positioned in said torque transmitting shaft for automatically operating in accordance with torque conditions a second means controlling the position of said connecting means.

2. In a power transmitting apparatus of the character described, a fluid driving member, a fluid driven member, an interposed reaction member for directing circulating fluid, a torque transmitting shaft attached to the driven member, means adapted to connect said reaction member to said driving member, means making said reaction member a guide member for circulating fluid, means adapted to hold said driven member by stopping the rotation of said torque transmitting shaft and permit independent rotation of said reaction member for absorbing circulating fluid energy, and means positioned in the torque transmitting shaft automatically responsive to torque conditions for operating said first two means.

3. In a power transmitting apparatus of the character described, a fluid driving member, a fluid driven member, an interposed reaction member adapted to run independently, or to be connected to the driving member, or to be held stationary as a guide member, a torque transmitting shaft attached to said driven member, manually operable means for determining the independent rotation of the reaction member, means automatically responsive to torque conditions and positioned in the torque transmitting shaft for operating means controlling the connection of the reaction member to the driving member or for holding it stationary, said manually operable means permitting independent rotation of the reaction member when the torque transmitting shaft is held fast.

4. A power transmitting apparatus comprising a fluid impeller, a member driven by the fluid, a reaction member interposed between the impeller and the driven member, means for connecting the reaction member to the impeller or to a stationary element, and torque responsive means for controlling said connecting means comprising a first shaft connected to the driven member, a second shaft alined with said first shaft, a casing surrounding adjacent ends of the alined shafts and connected to rotate with one of them, angularly disposed guides in the casing wall, a member in the casing mounted on the other shaft for rotation therewith and adapted to move longitudinally on said shaft and having followers projecting into said casing guides, yielding means opposing movement of the movable member in response to variations in torque transmitted by the first shaft, and means controlled by movement of said followers for operating said reaction member connecting means.

5. A power transmitting apparatus comprising a fluid impeller, a member driven by the fluid, a reaction member interposed between the impeller and the driven member, means for connecting the reaction member to the impeller or to a stationary element, and torque responsive means for controlling said connecting means comprising a first shaft connected to the driven member, a second shaft alined with said first shaft, a casing surrounding adjacent ends of the alined shafts and connected to rotate with one of them, angularly disposed slots in the casing wall, a member in the casing splined to the other shaft for movement thereon and having pins projecting into the casing slots, yielding means opposing movement of the movable member in response to variations in torque transmitted by the first shaft, and means controlled by movement of said pins for operating said reaction member connecting means.

6. A power transmitting apparatus comprising a fluid impeller, a member driven by the fluid, a torque transmitting shaft attached to said driven member, a reaction member interposed between the impeller and the driven member, a sleeve around said shaft and attached to said reaction member, means adapted to hold said sleeve against rotation, a second means adapted to attach said sleeve to said impeller thereby causing the impeller and reaction member to rotate as a unit, and torque responsive means positioned in said torque transmitting shaft controlling said first and second means.

7. A power transmitting apparatus comprising a fluid impeller, a member driven by the fluid, a torque transmitting shaft attached to said driven member, a reaction member interposed between the impeller and the driven member, a sleeve around said torque transmitting shaft and attached to said reaction member, means mounted on said sleeve for stopping the rotation thereof, an adjacent stationary element for holding said means from rotation, an element attached to the impeller, a second means mounted on said sleeve and adapted to engage the element attached to the impeller to thereby cause the reaction member and impeller to rotate as a unit, and torque responsive means positioned in the torque transmitting shaft controlling both said means.

8. A power transmitting apparatus comprising a fluid impeller, a member driven by the fluid, a torque transmitting shaft attached to said driven member, a reaction member interposed between the impeller and the driven member, a sleeve around said shaft and attached to said reaction member, means on said sleeve for connecting said reaction member to the impeller or to hold it stationary, said means comprising a first member mounted on said sleeve for rotation therewith, a stationary element adjacent said member and adapted to hold said member against rotation, a second member mounted on said sleeve for rotation therewith, an element for engaging said second member, said element attached to said impeller, at least two opposed cams mounted on said stationary element being adapted to cause said stationary element to hold or release said first member, means cooperating with one of said cams adapted to engage or disengage said second member with respect to the element attached to the impeller, and torque responsive means positioned in the torque transmitting shaft controlling said cooperating means.

9. A power transmitting apparatus comprising a fluid impeller, a member driven by the fluid, a torque transmitting shaft attached to said driven member, a reaction member interposed between the impeller and the driven member, a sleeve around said shaft and attached to said reaction member, means on said sleeve for connecting said reaction member to the impeller or to hold it stationary, torque responsive means positioned in the torque transmitting shaft controlling said first means, said first means comprising a first member mounted on said sleeve for rotation therewith, a stationary element adjacent said member and adapted to hold said member against rotation, a second member mounted on said sleeve for rotation therewith, an element for engaging said second member, said element attached to said impeller, at least two opposed cams mounted on said stationary element for operating said element, said cams having surfaces adapted to provide for continued relative motion of one of said cams over the other after their initial locking engagement, one of said cams being manually positioned and the other of said cams being positioned by said torque responsive means, and means cooperating with the other of said cams and the torque responsive means operating said second member and adapted to engage or disengage said second member from said impeller.

STANLEY MAYNER.